US011489685B2

(12) United States Patent
Tang et al.

(10) Patent No.: US 11,489,685 B2
(45) Date of Patent: Nov. 1, 2022

(54) METHOD AND APPARATUS FOR GENERATING A MEETING EFFICIENCY INDEX

(71) Applicant: JPMorgan Chase Bank, N.A., New York, NY (US)

(72) Inventors: Carlos M Tang, Princeton, NJ (US); Eugen Tarnow, Fair Lawn, NJ (US); Regina T Ganey, Belleville, NJ (US); Patricia McLaughlin, Ocean Beach, NY (US); Kevin Hall, Katy, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/449,325

(22) Filed: Sep. 29, 2021

(65) Prior Publication Data

US 2022/0103388 A1    Mar. 31, 2022

Related U.S. Application Data

(60) Provisional application No. 63/085,468, filed on Sep. 30, 2020.

(51) Int. Cl.
*H04L 12/18* (2006.01)
*G06N 20/00* (2019.01)
*G06V 40/20* (2022.01)

(52) U.S. Cl.
CPC ......... *H04L 12/1822* (2013.01); *G06N 20/00* (2019.01); *G06V 40/20* (2022.01); *H04L 12/1818* (2013.01)

(58) Field of Classification Search
CPC . H04L 12/1822; H04L 12/1818; G06N 20/00; G06V 40/20
See application file for complete search history.

(56) References Cited

U.S. PATENT DOCUMENTS

| | | | |
|---|---|---|---|
| 2018/0046957 A1* | 2/2018 | Yaari | G06Q 10/1095 |
| 2018/0107987 A1* | 4/2018 | MacKenzie | G06Q 10/063116 |
| 2018/0341925 A1* | 11/2018 | Leske | G06Q 10/1095 |
| 2019/0180248 A1* | 6/2019 | Byun | G06Q 10/1095 |
| 2019/0332994 A1* | 10/2019 | Adamson | G06Q 30/0283 |
| 2020/0202278 A1* | 6/2020 | Barton | G06Q 10/06393 |
| 2020/0234251 A1* | 7/2020 | Ma | G05B 23/0218 |
| 2020/0274726 A1* | 8/2020 | Setteboun | G06F 3/04817 |
| 2021/0406839 A1* | 12/2021 | Camenares | G10L 17/00 |

* cited by examiner

*Primary Examiner* — Jonathan A Bui

(74) *Attorney, Agent, or Firm* — Greenblum & Bernstein, P.L.C.

(57) ABSTRACT

Various methods, apparatuses/systems, and media for generating a meeting efficiency index are disclosed. A receiver receives a request from an organizer to organize a meeting. A processor, operatively connected to the receiver via a communication network, accesses a database to obtain management data, organizational behavior data, and psychological data corresponding to the requested meeting in response to the received request. The processor applies an algorithm to combine the obtained management data, organizational behavior data, and the psychological data to determine a meeting efficiency index (MEI) for the requested meeting. The MEI is a normalized measure to determine how effective the meeting will be in achieving its purpose. The processor causes a graphical user interface (GUI) to display the MEI in conjunction with calendar item and receive input data whether to accept or reject the meeting based on the MEI.

21 Claims, 5 Drawing Sheets

200

METHOD AND APPARATUS FOR GENERATING A MEETING EFFICIENCY INDEX

CROSS-REFERENCE TO RELATED APPLICATIONS

This application claims the benefit of priority from U.S. Provisional Patent Application No. 63/085,468, filed Sep. 30, 2020, which is herein incorporated by reference in its entirety.

TECHNICAL FIELD

This disclosure generally relates to data processing, and, more particularly, to methods and apparatuses for generating a meeting efficiency index, which is a normalized measure to determine how effective a meeting will be in achieving its purpose thereby improving efficiency and productivity.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, meetings in corporate America exact a heavy cost, yet they may be an essential means of communication and collaboration. Conventionally, optimizations in this area have been mainly qualitative in nature, mainly focusing on the structure of the meeting. There may be quantitative measures on the negative impacts that meetings cause, but currently no conventional system or method provides quantitative measures which balance the negative impacts with the positive ones. Thus, both meeting organizers and attendees may be left with mixed feelings—they know meetings are expensive, and likely they do not want to hold meetings, yet they feel they must.

SUMMARY

The present disclosure, through one or more of its various aspects, embodiments, and/or specific features or sub-components, may provide, among others, various systems, servers, devices, methods, media, programs, and platforms for generating a meeting efficiency index, which is a normalized measure to determine how effective a meeting will be in achieving its purpose thereby improving efficiency and productivity, but the disclosure is not limited thereto.

According to an aspect of the present disclosure, a method for generating a meeting efficiency index by utilizing one or more processors and one or more memories is disclosed. The method may include: receiving a request from an organizer via a computing device to organize a meeting to be attended by the organizer and one or more attendants of one or more organizations; accessing a database to obtain management data, organizational behavior data, and psychological data corresponding to the requested meeting in response to the received request; applying an algorithm to combine the obtained management data, organizational behavior data, and the psychological data to determine a meeting efficiency index (MEI) for the requested meeting, wherein the MEI is a normalized measure to determine how effective the meeting will be in achieving its purpose; displaying the MEI in conjunction with calendar item onto a graphical user interface (GUI) of the computing device; and receiving input data whether to accept or reject the meeting based on the MEI.

According to another aspect of the present disclosure, wherein the MEI is a numerical value which is weighted based on the combined management data, organizational behavior data, and psychological data.

According to yet another aspect of the present disclosure, the method may further include: comparing the MEI value to a predefined threshold value; and receiving input data to accept the meeting when it is determined that the MEI value is equal to or more than the predefined threshold value.

According to an aspect of the present disclosure, the method may further include: comparing the MEI value to a predefined threshold value; and receiving input data to reject the meeting when it is determined that the MEI value is lower than the predefined threshold value.

According to further aspect of the present disclosure, the method may further include: displaying the MEI onto the GUI in conjunction with calendar item as a color or a number or a word suggesting actions including acceptance and rejection of the meeting and whether the meeting should be organized.

According to yet another aspect of the present disclosure, the method may further include: applying machine learning algorithm to update the MEI based on received input data, wherein the received input data includes human and machine training and adjustment of algorithm using decisions data of meeting attendant to follow or reject the suggesting actions (i.e., MEI suggestions) and subsequent ratings by the meeting attendant as to quality of the suggesting actions (i.e., MEI suggestions), but the disclosure is not limited thereto.

According to an aspect of the present disclosure, wherein applying an algorithm to combine the obtained management data, organizational behavior data, and the psychological data to determine an MEI may further include: receiving, as inputs, one or more of the following data: data corresponding to the organizer, data as to whether attendance is required, data as to how many required attendants there are, data as to the organizer's and attendant's organizational levels, data as to the organizer's and attendant's departments, data as to meeting subject, data as to meeting agenda, and data as to whether the attendant and organizer meets personality profile, but the disclosure is not limited thereto.

According to further aspect of the present disclosure, the management data may correspond to data that constitutes business value of expected outcome of the meeting, but the disclosure is not limited thereto.

According to an additional aspect of the present disclosure, the organizational behavior data may correspond to data that constitutes how roles, responsibilities, and management hierarchy influence effectiveness of the meeting, but the disclosure is not limited thereto.

According to yet another aspect of the present disclosure, the psychological data may correspond to data that constitutes psychological safety, need to conform to societal norms, and peer pressure in attending the meeting.

According to an additional aspect of the present disclosure, the method may further include generating a meeting disruption index, wherein the meeting disruption index is set to be proportional to number of attendees and inversely proportional to a time interval between a meeting invitation or notice and the meeting itself.

According to yet another aspect of the present disclosure, the method may further include generating an organizer disruption index, wherein the organizer disruption index is an average of all meeting disruption indices of all meetings organized by the organizer.

According to a further aspect of the present disclosure, a system for generating a meeting efficiency index is disclosed. The system may include a receiver that receives a request from an organizer via a computing device to organize a meeting to be attended by the organizer and one or more attendants of one or more organizations, and a processor operatively connected to the receiver via a communication network. The processor may be configured to: access a database to obtain management data, organizational behavior data, and psychological data corresponding to the requested meeting in response to the received request; apply an algorithm to combine the obtained management data, organizational behavior data, and the psychological data to determine an MEI for the requested meeting, wherein the MEI is a normalized measure to determine how effective the meeting will be in achieving its purpose; cause a graphical user interface (GUI) of the computing device to display the MEI in conjunction with calendar item; and receive input data whether to accept or reject the meeting based on the MEI.

According to another aspect of the present disclosure, the processor may be further configured to: compare the MEI value to a predefined threshold value; and receive input data to accept the meeting when it is determined that the MEI value is equal to or more than the predefined threshold value.

According to an aspect of the present disclosure, the processor may be further configured to: compare the MEI value to a predefined threshold value; and receive input data to reject the meeting when it is determined that the MEI value is lower than the predefined threshold value.

According to further aspect of the present disclosure, the processor may be further configured to: cause a GUI to display the MEI in conjunction with calendar item as a color or a number or a word suggesting actions including acceptance and rejection of the meeting and whether the meeting should be organized.

According to yet another aspect of the present disclosure, the processor may be further configured to: apply machine learning algorithm to update the MEI based on received input data, wherein the received input data includes human and machine training and adjustment of algorithm using decisions data of meeting attendant to follow or reject the suggesting actions (i.e., MEI suggestions) and subsequent ratings by the meeting attendant as to quality of the suggesting actions (i.e., MEI suggestions), but the disclosure is not limited thereto.

According to an aspect of the present disclosure, wherein in applying an algorithm to combine the obtained management data, organizational behavior data, and the psychological data to determine an MEI, the processor may be further configured to receive, as inputs, one or more of the following data: data corresponding to the organizer, data as to whether attendance is required, data as to how many required attendants there are, data as to the organizer's and attendant's organizational levels, data as to the organizer's and attendant's departments, data as to meeting subject, data as to meeting agenda, and data as to whether the attendant and organizer meets personality profile, but the disclosure is not limited thereto.

According to an additional aspect of the present disclosure, the processor may be further configured to generate a meeting disruption index, wherein the meeting disruption index is set to be proportional to number of attendees and inversely proportional to a time interval between a meeting invitation or notice and the meeting itself.

According to yet another aspect of the present disclosure, the processor may be further configured to generate an organizer disruption index, wherein the organizer disruption index is an average of all meeting disruption indices of all meetings organized by the organizer.

According to a further aspect of the present disclosure, a non-transitory computer readable medium configured to store instructions for generating a meeting efficiency index is disclosed. The instructions, when executed, may cause a processor to perform the following: causing a receiver to receive a request from an organizer via a computing device to organize a meeting to be attended by the organizer and one or more attendants of one or more organizations; accessing a database to obtain management data, organizational behavior data, and psychological data corresponding to the requested meeting in response to the received request; applying an algorithm to combine the obtained management data, organizational behavior data, and the psychological data to determine an MEI for the requested meeting, wherein the MEI is a normalized measure to determine how effective the meeting will be in achieving its purpose; causing a graphical user interface (GUI) of the computing device to display the MEI in conjunction with calendar item; and receiving input data whether to accept or reject the meeting based on the MEI.

According to another aspect of the present disclosure, the instructions, when executed, may cause the processor to further perform the following: compare the MEI value to a predefined threshold value; and receive input data to accept the meeting when it is determined that the MEI value is equal to or more than the predefined threshold value.

According to an aspect of the present disclosure, the instructions, when executed, may cause the processor to further perform the following: compare the MEI value to a predefined threshold value; and receive input data to reject the meeting when it is determined that the MEI value is lower than the predefined threshold value.

According to further aspect of the present disclosure, the instructions, when executed, may cause the processor to further perform the following: cause a GUI to display the MEI in conjunction with calendar item as a color or a number or a word suggesting actions including acceptance and rejection of the meeting and whether the meeting should be organized.

According to yet another aspect of the present disclosure, the instructions, when executed, may cause the processor to further perform the following: apply machine learning algorithm to update the MEI based on received input data, wherein the received input data includes human and machine training and adjustment of algorithm using decisions data of meeting attendant to follow or reject the suggesting actions (i.e., MEI suggestions) and subsequent ratings by the meeting attendant as to quality of the suggesting actions (i.e., MEI suggestions), but the disclosure is not limited thereto.

According to an aspect of the present disclosure, wherein in applying an algorithm to combine the obtained management data, organizational behavior data, and the psychological data to determine an MEI, the instructions, when executed, may cause the processor to receive, as inputs, one or more of the following data: data corresponding to the organizer, data as to whether attendance is required, data as to how many required attendants there are, data as to the organizer's and attendant's organizational levels, data as to the organizer's and attendant's departments, data as to meeting subject, data as to meeting agenda, and data as to whether the attendant and organizer meets personality profile, but the disclosure is not limited thereto.

According to an additional aspect of the present disclosure, the instructions, when executed, may further cause the processor to generate a meeting disruption index, wherein the meeting disruption index is set to be proportional to number of attendees and inversely proportional to a time interval between a meeting invitation or notice and the meeting itself.

According to yet another aspect of the present disclosure, the instructions, when executed, may further cause the processor to generate an organizer disruption index, wherein the organizer disruption index is an average of all meeting disruption indices of all meetings organized by the organizer.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
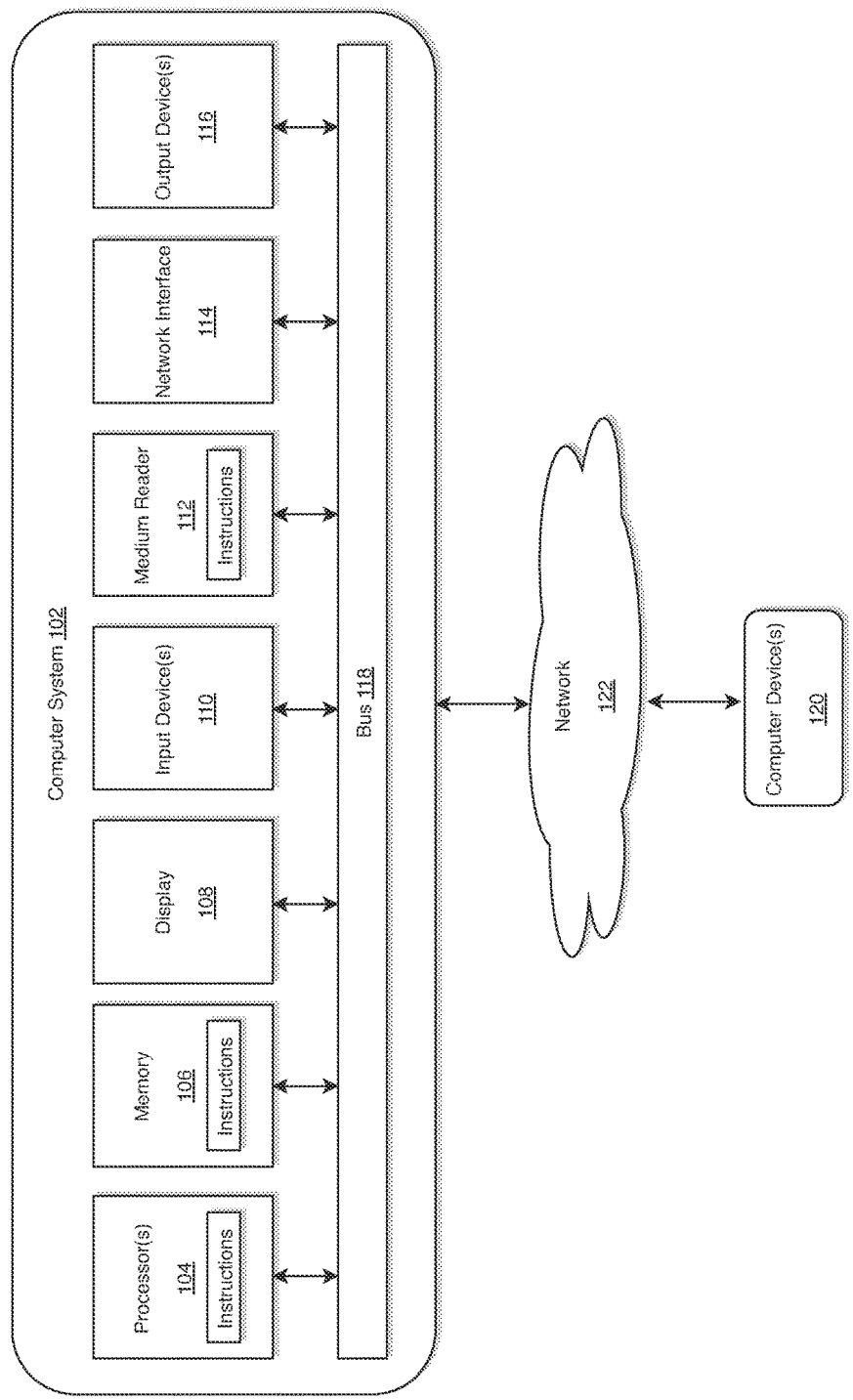
FIG. 1 illustrates a computer system for implementing a meeting efficiency index generating module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines, tools, devices and/or modules. Those skilled in the art will appreciate that these blocks, units, engines, tools, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, tools, devices, and/or modules being implemented by microprocessors or similar, they may be programmed using software (e.g., microcode) to perform various functions discussed herein and may optionally be driven by firmware and/or software. Alternatively, each block, unit, engine, tool device, and/or module may be implemented by dedicated hardware, or as a combination of dedicated hardware to perform some functions and a processor (e.g., one or more programmed microprocessors and associated circuitry) to perform other functions. Also, each block, unit, engine, tool, device, and/or module of the example embodiments may be physically separated into two or more interacting and discrete blocks, units, engines, tools, devices, and/or modules without departing from the scope of the inventive concepts. Further, the blocks, units, engines, tools, devices, and/or modules of the example embodiments may be physically combined into more complex blocks, units, engines, tools, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a meeting efficiency index generating module for generating a meeting efficiency index, which is a normalized measure to determine how effective a meeting will be in achieving its purpose thereby improving efficiency and productivity, but the disclosure is not limited thereto.

Figure 2:
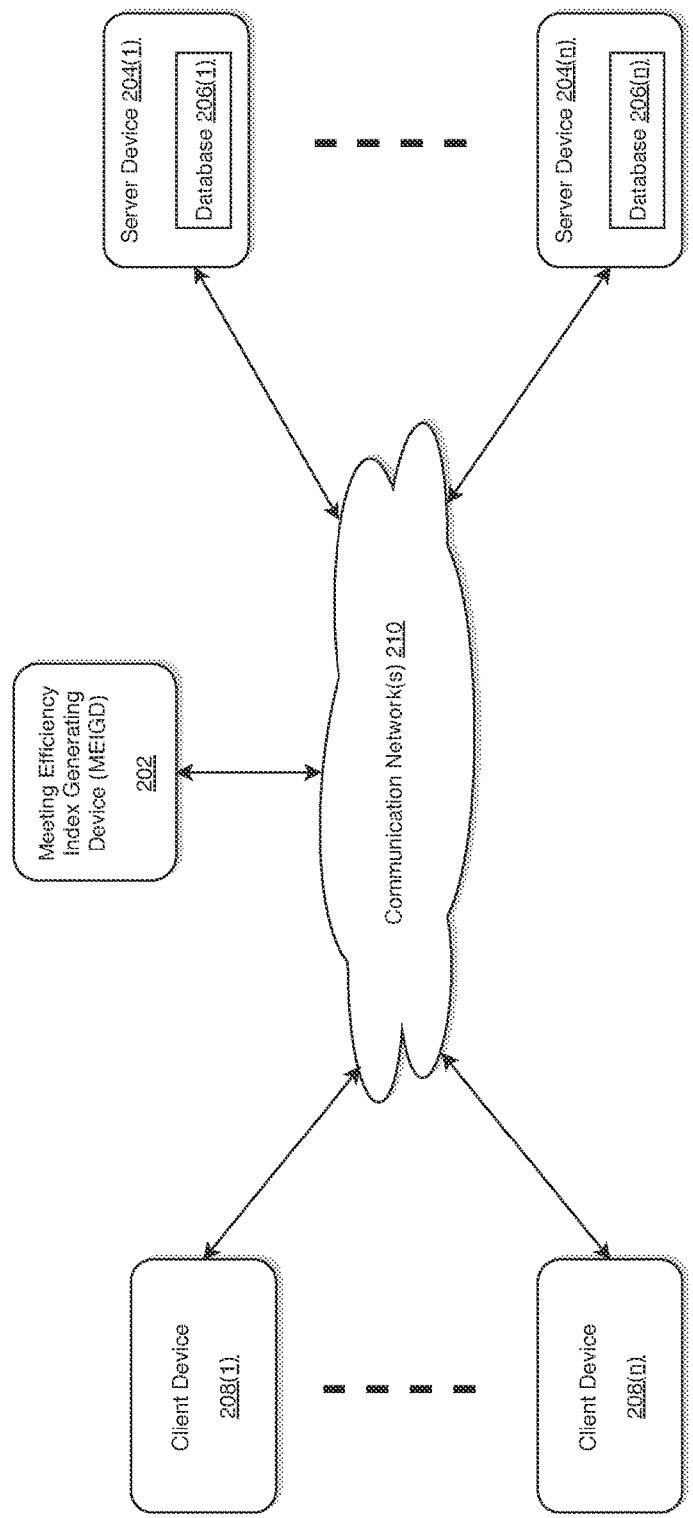
FIG. 2 illustrates an exemplary network diagram of a meeting efficiency index generating device in accordance with an exemplary embodiment.

Referring to FIG. 2, a schematic of an exemplary network environment 200 for implementing a meeting efficiency index generating device (MEIGD) of the instant disclosure is illustrated.

According to exemplary embodiments, the above-described problems associated with conventional system may be overcome by implementing an MEIGD 202 as illustrated in FIG. 2 to generate a meeting efficiency index, which is a normalized measure to determine how effective a meeting will be in achieving its purpose thereby improving efficiency and productivity, but the disclosure is not limited thereto.

The MEIGD 202 may be the same or similar to the computer system 102 as described with respect to FIG. 1.

The MEIGD 202 may store one or more applications that can include executable instructions that, when executed by the MEIGD 202, cause the MEIGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MEIGD 202 itself, may be located in virtual server(s) running in a cloud-based computing environment rather than being tied to one or more specific physical network computing devices. Also, the application(s) may be running in one or more virtual machines (VMs) executing on the MEIGD 202. Additionally, in one or more embodiments of this technology, virtual machine(s) running on the MEIGD 202 may be managed or supervised by a hypervisor.

In the network environment 200 of FIG. 2, the ACD 202 is coupled to a plurality of server devices 204(1)-204(n) that hosts a plurality of databases 206(1)-206(n), and also to a plurality of client devices 208(1)-208(n) via communication network(s) 210. A communication interface of the MEIGD 202, such as the network interface 114 of the computer system 102 of FIG. 1, operatively couples and communicates between the MEIGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MEIGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MEIGD 202 may be a standalone device or integrated with one or more other devices or apparatuses, such as one or more of the server devices 204(1)-204(n), for example. In one particular example, the MEIGD 202 may be hosted by one of the server devices 204(1)-204(n), and other arrangements are also possible. Moreover, one or more of the devices of the MEIGD 202 may be hosted in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MEIGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the MEIGD 202 that may provide a way to figuring out any changes to a project which might break any existing API consumers in an automated way, but the disclosure is not limited thereto.

Accordingly, the client devices 208(1)-208(n) may be mobile computing devices, desktop computing devices, laptop computing devices, tablet computing devices, virtual machines (including cloud-based computers), for example.

The client devices 208(1)-208(n) may run interface applications, such as standard web browsers or standalone client applications, which may provide an interface to communicate with the MEIGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MEIGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MEIGD 202, the server devices 204(1)-204(n), or the client devices 208(1)-208(n), for example, may be configured to operate as virtual instances on the same physical machine. For example, one or more of the MEIGD 202, the server devices 204(1)-204(n), or the client devices 208(1)-208(n) may operate on the same physical device rather than as separate devices communicating through communication network(s) 210. Additionally, there may be more or fewer MEIGD 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only tele-traffic in any suitable form (e.g., voice and modem), wireless traffic networks, cellular traffic networks, Packet Data Networks (PDNs), the Internet, intranets, and combinations thereof.

Figure 3:
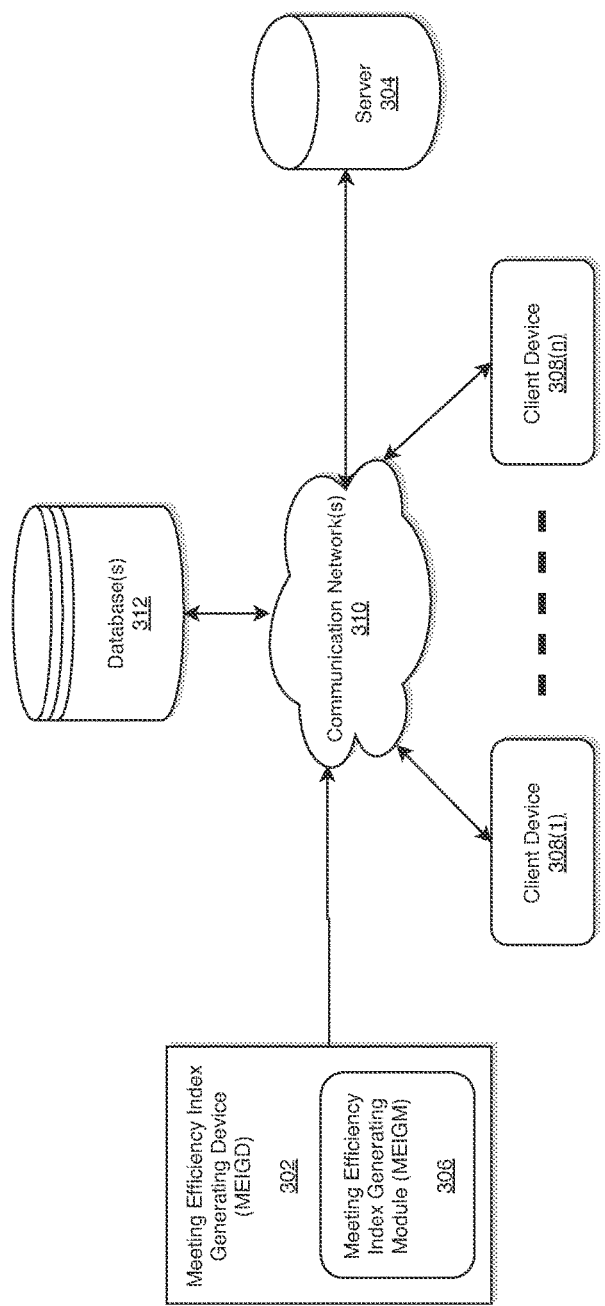
FIG. 3 illustrates a system diagram for implementing a meeting efficiency index generating device with a meeting efficiency index generating module in accordance with an exemplary embodiment.
Figure 4:
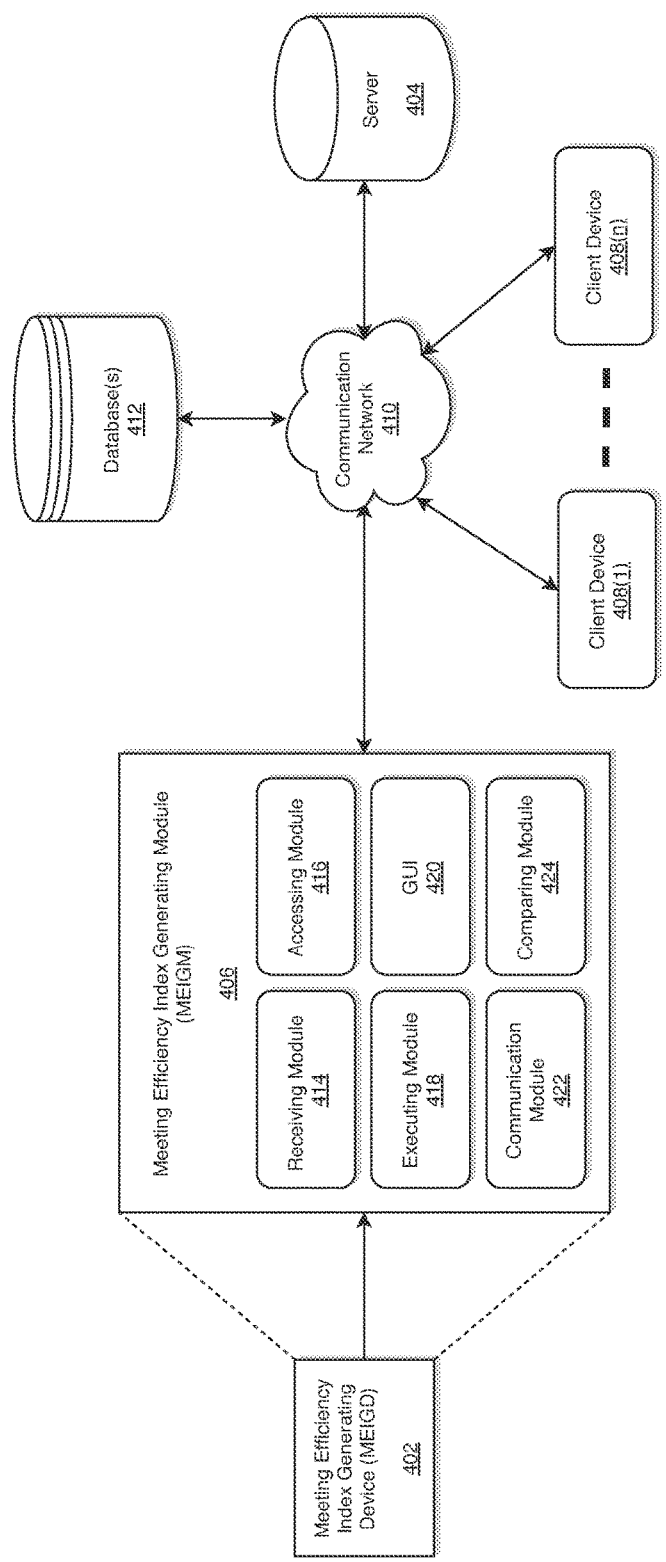
FIG. 4 illustrates a system diagram for implementing the meeting efficiency index generating module of FIG. 3 in accordance with an exemplary embodiment.

FIG. 3 illustrates a system diagram for implementing a meeting efficiency index generating device (MEIGD) with a meeting efficiency index generating module (MEIGM) in accordance with an exemplary embodiment. According to exemplary embodiments, the MEIGM may be implemented locally and the local MEIGM may include tools/module to generate the meeting efficiency index as illustrated in FIG. 4.

As illustrated in FIG. 3, in the system 300, according to exemplary embodiments, the MEIGD 302 along with the MEIGM 306 may be connected to a server 304 and database(s) 312 via a communication network 310, but the disclosure is not limited thereto. For example, according to exemplary embodiments, the MEIGD 302 may be connected to any desired databases besides the server 304 and the database(s) 312.

According to exemplary embodiments, the server 304 and the database(s) 312 may include memories that may store information and metadata associated with a meeting request, but the disclosure is not limited thereto.

According to exemplary embodiment, the MEIGD 302 may include other rules, policies, modules, databases, or applications, for example. According to exemplary embodiments, the server 304 may be configured to store information including the metadata, but the disclosure is not limited thereto. According to exemplary embodiments, MEIGD 302 may contain multiple stages connecting to various other tools to perform the required processes.

According to exemplary embodiments, the MEIGD 302 may be configured to receive continuous feed of data from the server 304 and the database(s) 312 via the communication network 310. According to exemplary embodiments, the MEIGD 302 may also be configured to communicate with one or more client devices 308(1)-308(n) (e.g., user's devices, meeting organizer's devices, etc.) via the communication network 310, but the disclosure is not limited thereto. According to exemplary embodiments, the client devices 308(1)-308(n) may also be referred to as organizer's systems/devices.

As will be described below, the MEIGM 306 may be configured to cause a receiver to receive a request from an organizer via a computing device (e.g., one or more of the client device 308(1)-308(n)) to organize a meeting to be attended by the organizer and one or more attendants of one or more organizations; access the database(s) 312 and/or server 304 to obtain management data, organizational behavior data, and psychological data corresponding to the requested meeting in response to the received request; apply an algorithm to combine the obtained management data, organizational behavior data, and the psychological data to determine a meeting efficiency index (MEI) for the requested meeting, wherein the MEI is a normalized measure to determine how effective the meeting will be in achieving its purpose; cause a graphical user interface (GUI) of the computing device (e.g., one or more of the client device 308(1)-308(n)) to display the MEI in conjunction with calendar item; and receive input data whether to accept or reject the meeting based on the MEI, but the disclosure is not limited thereto.

For example, according to exemplary embodiments, the MEIGM 306 embedded within the MEIGD 302 may be configured to solve the problems associated conventional processes organizing meeting invitations, but the disclosure is not limited thereto.

According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the client devices 308(1)-308(n) may communicate with the MEIGD 302 along with the MEIGM 306 via broadband or cellular communication. Of course, these embodiments are merely exemplary and are not limiting or exhaustive.

FIG. 4 illustrates a system diagram for implementing a meeting efficiency index generating module of FIG. 3 in accordance with an exemplary embodiment. As illustrated in FIG. 4, the system 400 may include a meeting efficiency index generating device (MEIGD) 402 with a meeting efficiency index generating module (MEIGM) 406 which may include tools/modules to implement the process of generating a meeting efficiency index. The MEIGM 406 may be operationally connected to one or more client devices 408(1)-408(n), a server 404, and one or more database(s) 412 a communication network 410.

As illustrated in FIG. 4, the MEIGM 406 may include a receiving module 414, an accessing module 416, an executing module 418, a GUI 420, a communication module 422, and a comparing module 424. Although FIG. 4 illustrates that the GUI 420 is embedded within the MEIGM 406, the disclosure is not limited thereto. For example, the GUI 420 may be also be embedded within each of the client device 408(1)-408(n). According to exemplary embodiments, the client devices 408(1)-408(n) may be the same or similar to the client devices 308(1)-308(n) as illustrated in FIG. 3, the server 404 may be the same or similar to the server 304 as illustrated in FIG. 3, the database(s) 412 may be the same or similar to the database(s) 312 as illustrated in FIG. 3, and the communication network 410 may be same or similar to the communication network 310 as illustrated in FIG. 3.

The process may be executed via the communication network 410 which may comprise plural networks as described above. For example, in an exemplary embodiment, the various components of the MEIGM 406 may communicate with the various components of the database(s) 412, server 405, and the client devices 408(1)-408(n) via the communication module 422 and the communication network 410. Of course, these embodiments are merely exemplary and are not limiting or exhaustive.

According to exemplary embodiments, each of the receiving module 414, accessing module 416, executing module 418, communication module 422, and the comparing module 424 may be implemented by microprocessors or similar, they may be programmed using software (e.g., microcode) to perform various functions discussed herein. Alternatively, each of the receiving module 414, accessing module 416, executing module 418, communication module 422, and the comparing module 424 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the receiving module 414, accessing module 416, executing module 418, communication module 422, and the comparing module 424 may be physically separated into two or more interacting and discrete blocks, units, engines, devices, and/or modules without departing from the scope of the inventive concepts.

According to exemplary embodiments, the receiving module 414 may be configured to receive a request from an organizer via a computing device (e.g., one of the client device 408(1)-(408(n)) to organize a meeting to be attended by the organizer and one or more attendants of one or more organizations.

According to exemplary embodiments, the accessing module 416 may be configured to access the database(s) 412 and/or server 404 to obtain management data, organizational behavior data, and psychological data corresponding to the requested meeting in response to the received request.

According to exemplary embodiments, the executing module 418 may be configured to apply an algorithm to combine the obtained management data, organizational behavior data, and the psychological data to determine a meeting efficiency index (MEI) for the requested meeting. According to exemplary embodiments, the MEI is a normalized measure to determine how effective the meeting will be in achieving its purpose.

The GUI 420 may be configured to display the MEI in conjunction with calendar item, and the receiving module 414 may be configured to receive input data whether to accept or reject the meeting based on the MEI.

According to exemplary embodiments, the MEI may be a numerical value which may be weighted based on the combined management data, organizational behavior data, and psychological data received from the database(s) 412 and/or the server 404. The comparing module 424 may be configured to compare the MEI value to a predefined threshold value and the receiving module 414 may be configured to receive input data to accept the meeting when it is determined by the comparing module 424 that the MEI value is equal to or more than the predefined threshold value. According to exemplary embodiments, the receiving module 414 may also be configured to receive input data to reject the meeting when it is determined by the comparing module 424 that the MEI value is less than the predefined threshold value.

According to exemplary embodiments, the GUI 420 may display the MEI onto in conjunction with calendar item as a color or a number or a word suggesting actions including acceptance and rejection of the meeting and whether the meeting should be organized.

According to exemplary embodiments, the executing module 418 may be configured apply machine learning algorithm to update the MEI based on received input data, The received input data may include human and machine training and adjustment of algorithm using decisions data of meeting attendant to follow or reject the suggesting actions (i.e., MEI suggestions) and subsequent ratings by the meeting attendant as to the quality of the suggesting actions (i.e., MEI suggestions). Thus, according to exemplary embodiments, a meeting attendant may provide feedback as to the quality of the MEI suggestions in the following two ways, but the disclosure is not limited thereto: i) whether to accept or reject the meeting; and ii) if the meeting was accepted and the attendant went to the meeting, the attendant to provide feedback to the MEIGM 406 as to what the quality of the meeting was, in a numerical scale.

According to exemplary embodiments, the MEIGM 406 may be further configured to allow the receiving module 414 to receive, as inputs, one or more of the following data: data corresponding to the organizer, data as to whether attendance is required, data as to how many required attendants there are, data as to the organizer's and attendant's organizational levels, data as to the organizer's and attendant's departments, data as to meeting subject, data as to meeting agenda, and data as to whether the attendant and organizer meets personality profile, but the disclosure is not limited thereto. The executing module 418 may be further configured to applying the algorithm to combine the obtained management data, organizational behavior data, and the psychological data to determine a meeting efficiency index (MEI) based on the received data.

According to exemplary embodiments, the management data may correspond to data that constitutes business value of expected outcome of the meeting, but the disclosure is not limited thereto.

According to exemplary embodiments, the organizational behavior data may correspond to data that constitutes how roles, responsibilities, and management hierarchy influence effectiveness of the meeting, but the disclosure is not limited thereto.

According to exemplary embodiments, the psychological data may correspond to data that constitutes psychological safety, need to conform to societal norms, and peer pressure in attending the meeting.

According to exemplary embodiments, the MEIGM 406 may be configured to implement the executing module 418 to apply the algorithm that utilize feedback data, thereby improving the performance and accuracy of the MEIGM 406 in generating the MEI which gets better and better over time.

In generating the MEI, the MEIGM 406 receives data as to who the organizer of the meeting is, what role the organizer has and what is the position of the organizer with respect to management hierarchy, as well as which department is organizing the meeting; and what is the level of the meeting organizer in that organization. For example, the MEIGM 406 may assign a comparatively low value (e.g., 2 out of 10) to MEI if the level of the organizer is comparatively low in that organization. Similarly, the MEIGM 406 may assign a comparatively high value (e.g., 8 out of 10) to MEI if the level of the organizer is comparatively high in that organization. That is, if the organizer is higher up in the hierarchy of that organization, the MEIGM assigns a high index value. For example, highest index value (e.g., 10 out 10) may be assigned to the meeting if the meeting organizer's position is the highest level at the organization. And based on the highest index value, the MEI requested by an organizer may be changed depending on how far the level of the organizer is away from the top guy in the organization. According to exemplary embodiments, level index value of the MEI may be proportionally related to the hierarchy of an organization (e.g., managing director's level>executive director's level>vice president's level>associate's level, etc.).

Initial implementation of the MEIGM 406 may be tuned to one individual. For example, if someone (i.e., the meeting organizer) wants to meet with an attendant—if the organizer is two level lower than the highest level then the MEIGM 406 assigns an index value that is two level lower than the highest value if the organizer is at the same level as the attendant.

According to exemplary embodiments, the MEI value is also proportionally related with the proximity data of the organizer. For example, if the meeting organizer is from a department whose operational data is totally far from the attendant's department's operational data (i.e., the attendant is from a different field of operation than the meeting organizer), then the MEIGM 406 assigns a high MEI value.

On the other hand, if the meeting organizer is from the same or similar department whose operational data is the same or similar to the attendant's department's operational data (i.e., the attendant is from the same or similar field of operation as the meeting organizer), then the MEIGM 406 assigns a high MEI value.

According to exemplary embodiments, the MEIGM 406 may also be configured to generate weighted values based upon which group the organizer belongs to (i.e., low weighted value if remote group—high weighted value if same or similar group). For example a client group will have a high value (because it is very important to meet with the client or a potential client). If it is random group that the attendant has limited knowledge about why he/she should meet with the meeting organizer, then the MEIGM 406 assigns a low index value.

According to exemplary embodiments, the MEIGM 406 may adjust MEI based on regional data. For example, if the organizer is in India, then it is logical for an organization to expect that someone from India should meet with the organizer. Thus, the meeting invitation to someone from India will have higher MEI value compared to someone who does not reside in India.

According to exemplary embodiments, if the manager of the attendants is requesting the meeting, then the MEIGM 406 will assign a high MEI value for all the attendants.

According to exemplary embodiments, the MEIGM 406 may adjust the MEI value depending on how many people is attending the meeting and whether a user (i.e., requested attendant) indicates that he/she already has a direct report of the meeting. For example, if the user indicates that someone from his/her department is already going to attend the requested meeting who directly reports to the user, and therefore, the user does not need to attend the requested meeting, the MEIGM 406 may select that person (who will report to the user after the meeting) to attend the meeting instead of the user. Thus, the MEIGM 406 will assign a low MEI value for that user who has a direct report.

The MEIGM 406 may also be configured to adjust the MEI value based on historical data. For example, the MEIGM 406 may analyze input historical data related to an organizer, attendees, department, title, etc., and determine that for a particular subject that there is actually a large number of meetings where what the MEIGM 406 predicted the index value should be is actually lower than as predicted before, yet the user's manager is attending all of those meetings. Thus, in that case, the MEIGM 406 may be configured to implement an algorithm to assign a high MEI value for a meeting when the MEIGM 406 determines that the manager of the user is attending (i.e., an algorithm that if a user's manager attends a meeting, the user is expected to attend the meeting as well).

According to exemplary embodiments, psychological data value may include the following categories: 1) meetings that a user would like to go; 2) meetings that the user have to go no matter the user like it or not because the user's manager is attending; 3) user don't have to go and user don't want to go. Thus, the MEIGM 406 may be configured to automatically delete those meetings from the user's GUI 420 for category 3. But, for category 2, the MEIGM 406 may be configured to generate a high MEI value for the boss, but may analyze separate index value for each attendee who is not the manager. For example, if the MEIGM 406 determines, based on received data, that only five (5) out of twenty (20) attendees really want to go, then the MEIGM 406 may be configured to modify the index value based on determining whether it is efficient and effective in achieving the meeting's intended purpose to allow the attendees to attend the meeting who do not want to attend the meeting. That is, if the MEIGM 406 determines that it may not be efficient and may not be effective in achieving the meeting's intended purpose if the attendees who do not want to attend the meeting actually attend, then the MEIGM 406 will assign a low MEI value for those who do not want to attend the meeting.

According to exemplary embodiments, the MEIGM 406 may be configured to allow the GUI 420 to prompt a notification and selection options for the user to choose to accept or reject a meeting, or override a recommendation. If the user overrides, the MEIGM 406 will prompt another notification to indicate why did the user override it (or which MEI value is incorrect. The MEIGM 406 may be configured to implement a machine learning algorithm based on received feedback data from the user.

According to exemplary embodiments, the MEIGM 406 may be further configured to generate a meeting disruption index, wherein the meeting disruption index is set to be proportional to number of attendees and inversely proportional to a time interval between a meeting invitation or notice and the meeting itself.

According to exemplary embodiments, the MEIGM 406 may be further configured to generate an organizer disruption index, wherein the organizer disruption index is an average of all meeting disruption indices of all meetings organized by the organizer.

Figure 5:
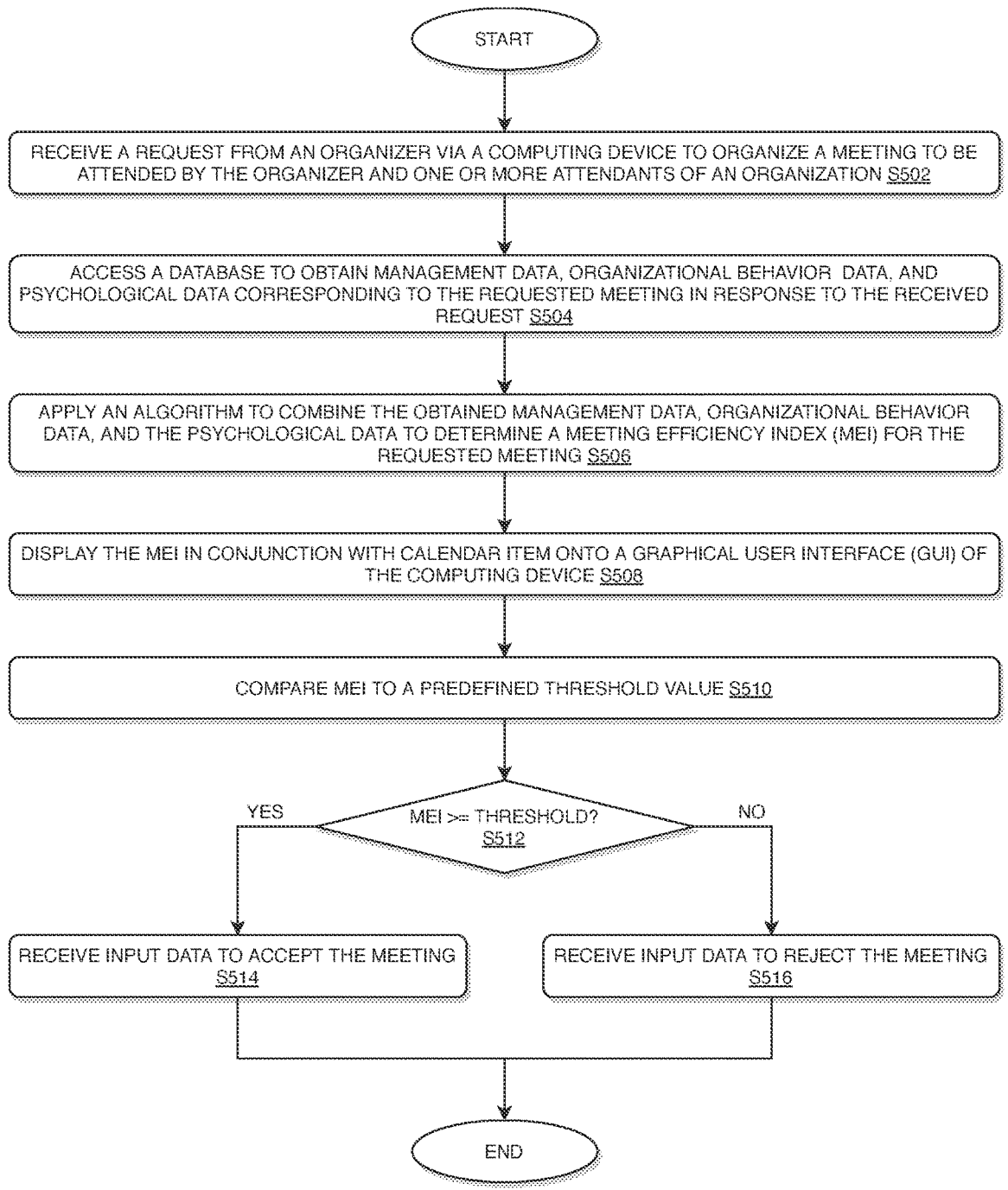
FIG. 5 illustrates a flow chart for generating a meeting efficiency index in accordance with an exemplary embodiment.

FIG. 5 illustrates a flow chart for implementing the MEIGM 406 to generate a MEI value in accordance with an exemplary embodiment.

In the process 500 of FIG. 5, at step S502, a request may be received from an organizer via a computing device to organize a meeting to be attended by the organizer and one or more attendants of one or more organizations. It will be appreciated that the illustrated process 500 and associated steps may be performed in a different order, with illustrated steps omitted, with additional steps added, or with a combination of reordered, combined, omitted, or additional steps.

At step S504, a database/server may be accessed to obtain management data, organizational behavior data, and psychological data corresponding to the requested meeting in response to the received request.

At step S506, an algorithm may be applied to combine the obtained management data, organizational behavior data, and the psychological data to determine a meeting efficiency index (MEI) for the requested meeting. The MEI may be a normalized measure to determine how effective the meeting will be in achieving its purpose.

At step S508, the MEI in conjunction with calendar item may be displayed onto a graphical user interface (GUI) of the computing device.

At step S510, the MEI value may be compared to a predefined threshold value, and at step S512 of the process 500, it is determined whether the MEI value is more than or equal to the predefined threshold value.

At step S514, input data is received to accept the meeting when it is determined in step S512 that the MEI value is equal to or more than the predefined threshold value.

At step S516, input data is received to reject the meeting when it is determined in step S512 that the MEI value is less than the predefined threshold value.

According to exemplary embodiments, the process 500 may further include: comparing the MEI value to a predefined threshold value; and receiving input data to accept the meeting when it is determined that the MEI value is equal to or more than the predefined threshold value.

According to exemplary embodiments, the process 500 may further include: comparing the MEI value to a predefined threshold value; and receiving input data to reject the meeting when it is determined that the MEI value is lower than the predefined threshold value.

According to exemplary embodiments, the process 500 may further include: displaying the MEI onto the GUI in conjunction with calendar item as a color or a number or a word suggesting actions including acceptance and rejection of the meeting and whether the meeting should be organized.

According to exemplary embodiments, the process 500 may further include: applying machine learning algorithm to update the MEI based on received input data, wherein the received input data includes human and machine training and adjustment of algorithm using decisions data of meeting attendant to follow or reject the suggesting actions (i.e., MEI suggestions) and subsequent ratings by the meeting attendant as to quality of the suggesting actions (i.e., MEI suggestions).

According to an aspect of the present disclosure, wherein in applying an algorithm to combine the obtained management data, organizational behavior data, and the psychological data to determine an MEI, the process 500 may further include: receiving, as inputs, one or more of the following data: data corresponding to the organizer, data as to whether attendance is required, data as to how many required attendants there are, data as to the organizer's and attendant's organizational levels, data as to the organizer's and attendant's departments, data as to meeting subject, data as to meeting agenda, and data as to whether the attendant and organizer meets personality profile, but the disclosure is not limited thereto.

According to exemplary embodiments, the process 500 may be further include generating a meeting disruption index, wherein the meeting disruption index is set to be proportional to number of attendees and inversely proportional to a time interval between a meeting invitation or notice and the meeting itself.

According to exemplary embodiments, the process 500 may further include generating an organizer disruption index, wherein the organizer disruption index is an average of all meeting disruption indices of all meetings organized by the organizer.

According to exemplary embodiments, the MEIGD 402 may include a memory (e.g., a memory 106 as illustrated in FIG. 1) which may be a non-transitory computer readable medium that may be configured to store instructions for implementing the MEIGM 406 to generate a MEI value as disclosed herein, but the disclosure is not limited thereto. The MEIGD 402 may also include a medium reader (e.g., a medium reader 112 as illustrated in FIG. 1) which may be configured to read any one or more sets of instructions, e.g., software, from any of the memories described herein. The instructions, when executed by a processor embedded within the MEIGM 406 or within the MEIGD 402, may be used to perform one or more of the methods and processes as described herein. In a particular embodiment, the instructions may reside completely, or at least partially, within the memory 106, the medium reader 112, and/or the processor 104 (see FIG. 1) during execution by the MEIGD 402.

According to exemplary embodiments, the instructions, when executed, may cause a processor embedded within the MEIGM 406 to perform the following: causing a receiver to receive a request from an organizer via a computing device to organize a meeting to be attended by the organizer and one or more attendants of one or more organizations; accessing a database to obtain management data, organizational behavior data, and psychological data corresponding to the requested meeting in response to the received request; applying an algorithm to combine the obtained management data, organizational behavior data, and the psychological data to determine a meeting efficiency index (MEI) for the requested meeting, wherein the MEI is a normalized measure to determine how effective the meeting will be in achieving its purpose; causing a graphical user interface (GUI) of the computing device to display the MEI in conjunction with calendar item onto; and receiving input data whether to accept or reject the meeting based on the MEI. The processor may be the same or similar to the processor 104 as illustrated in FIG. 1.

According to exemplary embodiments, the instructions, when executed may further cause the processor 104 to perform the following: comparing the MEI value to a predefined threshold value; and receiving input data to accept the meeting when it is determined that the MEI value is equal to or more than the predefined threshold value.

According to exemplary embodiments, the instructions, when executed may further cause the processor 104 to perform the following: comparing the MEI value to a predefined threshold value; and receiving input data to reject the meeting when it is determined that the MEI value is lower than the predefined threshold value.

According to exemplary embodiments, the instructions, when executed may further cause the processor 104 to perform the following: displaying the MEI onto the GUI in conjunction with calendar item as a color or a number or a word suggesting actions including acceptance and rejection of the meeting and whether the meeting should be organized.

According to exemplary embodiments, the instructions, when executed may cause the processor 104 to perform the following: applying machine learning algorithm to update the MEI based on received input data, wherein the received input data includes human and machine training and adjustment of algorithm using decisions data of meeting attendant to follow or reject the suggesting actions (i.e., MEI suggestions) and subsequent ratings by the meeting attendant as to quality of the suggesting actions (i.e., MEI suggestions).

According to an aspect of the present disclosure, wherein in applying an algorithm to combine the obtained management data, organizational behavior data, and the psychological data to determine an MEI, the instructions, when executed may further cause the processor 104 to perform the following: receiving, as inputs, one or more of the following data: data corresponding to the organizer, data as to whether attendance is required, data as to how many required attendants there are, data as to the organizer's and attendant's organizational levels, data as to the organizer's and attendant's departments, data as to meeting subject, data as to meeting agenda, and data as to whether the attendant and organizer meets personality profile, but the disclosure is not limited thereto.

According to exemplary embodiments, the instructions, when executed, may further cause the processor 104 to generate a meeting disruption index, wherein the meeting disruption index is set to be proportional to number of attendees and inversely proportional to a time interval between a meeting invitation or notice and the meeting itself.

According to exemplary embodiments, the instructions, when executed, may further cause the processor 104 to generate an organizer disruption index, wherein the organizer disruption index is an average of all meeting disruption indices of all meetings organized by the organizer.

According to exemplary embodiments as disclosed above in FIGS. 1-5, technical improvements effected by the instant disclosure may include platforms for implementing an MEIGM for generating a meeting efficiency index, which is a normalized measure to determine how effective a meeting will be in achieving its purpose thereby improving efficiency and productivity, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a meeting efficiency index by utilizing one or more processors and one or more memories, the method comprising:
receiving a request from an organizer via a computing device to organize a meeting to be attended by the organizer and one or more attendants of one or more organizations;
accessing a database to obtain management data, organizational behavior data, and psychological data corresponding to the requested meeting in response to the received request;
applying an algorithm to combine the obtained management data, organizational behavior data, and the psychological data to determine a meeting efficiency index (MEI) for the requested meeting, wherein the MEI is a normalized measure to determine how effective the meeting will be in achieving its purpose;
displaying the MEI in conjunction with calendar item onto a graphical user interface (GUI) of the computing device; and
receiving input data whether to accept or reject the meeting based on the MEI.

2. The method according to claim 1, wherein the MEI is a numerical value which is weighted based on the combined management data, organizational behavior data, and psychological data.

3. The method according to claim 2, further comprising:
comparing the MEI value to a predefined threshold value; and
receiving input data to accept the meeting when it is determined that the MEI value is equal to or more than the predefined threshold value.

4. The method according to claim 2, further comprising:
comparing the MEI value to a predefined threshold value; and
receiving input data to reject the meeting when it is determined that the MEI value is lower than the predefined threshold value.

5. The method according to claim 1, further comprising:
displaying the MEI onto the GUI in conjunction with calendar item as a color or a number or a word suggesting actions including acceptance and rejection of the meeting and whether the meeting should be organized.

6. The method according to claim 5, further comprising:
applying machine learning algorithm to update the MEI based on received input data, wherein the received input data includes human and machine training and adjustment of algorithm using decisions data of meeting attendant to follow or reject the suggesting actions and subsequent ratings by the meeting attendant as to a quality of the suggesting actions.

7. The method according to claim 1, wherein applying an algorithm to combine the obtained management data, organizational behavior data, and the psychological data to determine a meeting efficiency index (MEI) further comprising:
receiving, as inputs, one or more of the following data: data corresponding to the organizer, data as to whether attendance is required, data as to how many required attendants there are, data as to the organizer's and attendant's organizational levels, data as to the organizer's and attendant's departments, data as to meeting subject, data as to meeting agenda, and data as to whether the attendant and organizer meets personality profile.

8. The method according to claim 1, wherein the management data corresponds to data that constitutes business value of expected outcome of the meeting.

9. The method according to claim 1, wherein the organizational behavior data corresponds to data that constitutes how roles, responsibilities, and management hierarchy influence effectiveness of the meeting.

10. The method according to claim 1, wherein the psychological data corresponds to data that constitutes psychological safety, need to conform to societal norms, and peer pressure in attending the meeting.

11. A system for generating a meeting efficiency index, comprising:
a receiver that receives a request from an organizer via a computing device to organize a meeting to be attended by the organizer and one or more attendants of one or more organizations; and
a processor operatively connected to the receiver via a communication network, wherein the processor is configured to:
access a database to obtain management data, organizational behavior data, and psychological data corresponding to the requested meeting in response to the received request;
apply an algorithm to combine the obtained management data, organizational behavior data, and the psychological data to determine a meeting efficiency index (MEI) for the requested meeting, wherein the MEI is a normalized measure to determine how effective the meeting will be in achieving its purpose;
cause a graphical user interface (GUI) of the computing device to display the MEI in conjunction with calendar item onto; and
receive input data whether to accept or reject the meeting based on the MEI.

12. The system according to claim 11, wherein the MEI is a numerical value which is weighted based on the combined management data, organizational behavior data, and psychological data.

13. The system according to claim 12, wherein the processor is further configured to:
compare the MEI value to a predefined threshold value; and
receive input data to accept the meeting when it is determined that the MEI value is equal to or more than the predefined threshold value.

14. The system according to claim 12, wherein the processor is further configured to:
compare the MEI value to a predefined threshold value; and
receive input data to reject the meeting when it is determined that the MEI value is lower than the predefined threshold value.

15. The system according to claim 11, wherein the processor is further configured to:
display the MEI onto the GUI in conjunction with calendar item as a color or a number or a word suggesting actions including acceptance and rejection of the meeting and whether the meeting should be organized.

16. The system according to claim 15, wherein the processor is further configured to:
apply machine learning algorithm to update the MEI based on received input data, wherein the received input data includes human and machine training and adjustment of algorithm using decisions data of meeting attendant to follow or reject the suggesting actions and subsequent ratings by the meeting attendant as to a quality of the suggesting actions.

17. The system according to claim 11, wherein in applying an algorithm to combine the obtained management data, organizational behavior data, and the psychological data to determine a meeting efficiency index (MEI), the processor is further configured to:
receive, as inputs, one or more of the following data: data corresponding to the organizer, data as to whether attendance is required, data as to how many required attendants there are, data as to the organizer's and attendant's organizational levels, data as to the organizer's and attendant's departments, data as to meeting subject, data as to meeting agenda, and data as to whether the attendant and organizer meets personality profile.

18. The system according to claim 11, wherein the management data corresponds to data that constitutes business value of expected outcome of the meeting, wherein the organizational behavior data corresponds to data that constitutes how roles, responsibilities, and management hierarchy influence effectiveness of the meeting, and wherein the psychological data corresponds to data that constitutes psychological safety, need to conform to societal norms, and peer pressure in attending the meeting.

19. The system according to claim 11, wherein the processor is further configured to generate a meeting disruption index, wherein the meeting disruption index is set to be proportional to number of attendees and inversely proportional to a time interval between a meeting invitation or a notice and the meeting itself.

20. The system according to claim 19, wherein the processor is further configured to generate an organizer disruption index, wherein the organizer disruption index is an average of all meeting disruption indices of all meetings organized by the organizer.

21. A non-transitory computer readable medium configured to store instructions for generating a meeting efficiency index, wherein, when executed, the instructions cause a processor to perform the following:
causing a receiver to receive a request from an organizer via a computing device to organize a meeting to be attended by the organizer and one or more attendants of one or more organizations;
accessing a database to obtain management data, organizational behavior data, and psychological data corresponding to the requested meeting in response to the received request;
applying an algorithm to combine the obtained management data, organizational behavior data, and the psychological data to determine a meeting efficiency index (MEI) for the requested meeting, wherein the MEI is a normalized measure to determine how effective the meeting will be in achieving its purpose;
causing a graphical user interface (GUI) of the computing device to display the MEI in conjunction with calendar item onto; and
receiving input data whether to accept or reject the meeting based on the MEI.

\* \* \* \* \*